United States Patent
Shimosugi

(10) Patent No.: US 10,066,070 B2
(45) Date of Patent: Sep. 4, 2018

(54) TRANSPARENT LAMINATE FILM

(71) Applicant: DAICEL CORPORATION, Osaka-shi, Osaka (JP)

(72) Inventor: Shota Shimosugi, Amagasaki (JP)

(73) Assignee: DAICEL CORPORATION, Osaka-Shi (JP)

(*) Notice: Subject to any disclaimer, the term of this patent is extended or adjusted under 35 U.S.C. 154(b) by 0 days.

(21) Appl. No.: 15/552,940

(22) PCT Filed: Mar. 9, 2016

(86) PCT No.: PCT/JP2016/057405
§ 371 (c)(1),
(2) Date: Aug. 23, 2017

(87) PCT Pub. No.: WO2016/158270
PCT Pub. Date: Oct. 6, 2016

(65) Prior Publication Data
US 2018/0030229 A1    Feb. 1, 2018

(30) Foreign Application Priority Data

Apr. 2, 2015 (JP) ................................ 2015-076298

(51) Int. Cl.
*C08J 7/04* (2006.01)
*G06F 3/044* (2006.01)

(52) U.S. Cl.
CPC .............. *C08J 7/047* (2013.01); *G06F 3/044* (2013.01); *C08J 2367/02* (2013.01); *C08J 2435/02* (2013.01)

(58) Field of Classification Search
CPC .... C08J 7/047; C08J 2435/02; C08J 2367/02; C08J 2433/00; C08J 2301/12; G06F 3/044; G06F 3/041; C09D 133/14
See application file for complete search history.

(56) References Cited

U.S. PATENT DOCUMENTS

2007/0247568 A1* 10/2007 Suga ...................... G02B 1/105
349/96
2009/0002323 A1* 1/2009 Shiroishi ................ G06F 3/044
345/173
2012/0015144 A1* 1/2012 Itoh .......................... G06F 3/041
428/142
2013/0122251 A1   5/2013 Matsumoto et al.
2015/0291828 A1  10/2015 Yokoyama et al.

FOREIGN PATENT DOCUMENTS

| JP | 2010-153298 A | 7/2010 |
| JP | 2013-122745 A | 6/2013 |
| JP | 2014-97649 A  | 5/2014 |
| JP | 2014-137640 A | 7/2014 |
| JP | 2014-149817 A | 8/2014 |
| JP | 2015-54417 A  | 3/2015 |
| JP | 2015-55928 A  | 3/2015 |

OTHER PUBLICATIONS

Noda et al, 1998, Google English translation for JPH10172377A.*
International Search Report, issued in PCT/JP2016/057405, dated Apr. 12, 2016.
Written Opinion of the International Searching Authority, issued in PCT/JP2016/057405, dated Apr. 12, 2016.
English translation of International Preliminary Report on Patentability and Written Opinion dated Oct. 12, 2017, in PCT International Application No. PCT/JP2016/057405.

* cited by examiner

*Primary Examiner* — Nathan L Van Sell
(74) *Attorney, Agent, or Firm* — Birch, Stewart, Kolasch & Birch, LLP

(57) ABSTRACT

A coat layer and a substrate layer are combined to prepare a transparent laminate film; the coat layer has a surface with a maximum height of rolling circle waviness profile ($W_{EM}$) in accordance with JIS B0610 of 5 to 15 μm and an arithmetic average roughness (Ra) of not less than 0.5 μm. The transparent laminate film provides a comfortable writing experience and a reduced abrasion of a pen tip. The coat layer may have the surface with the arithmetic average roughness (Ra) of 0.5 to 5 μm. The coat layer may contain particles and a binder component. The binder component may comprise a polyfunctional (meth)acrylate, and a urethane (meth)acrylate and/or a thermoplastic elastomer. The transparent laminate film may have a total light transmittance of not less than 85%. The transparent laminate film may be disposed on a surface of a display of a pen-input device.

8 Claims, No Drawings

TRANSPARENT LAMINATE FILM

TECHNICAL FIELD

The present invention relates to a transparent laminate film used as a film to be dispersed on an input surface of a pen-input touch screen (or touch panel) display, a pen tablet, or other devices.

BACKGROUND ART

A progress in an electronic display as man machine interface has resulted in popularization of an interactive input system. Among others, an apparatus having a touch screen (a digitizer) and an associated display is widely used in various fields such as an ATM (automated teller machine), a merchandise management, an outworking (canvassing, selling), a guide sign, and an entertainment device. Use of the touch screen in combination with a lightweight and thin display (e.g., a liquid crystal display) dispenses with any keyboard and exhibits the features of the display, and thus such a touch screen display is increasingly used for mobile devices. The touch screen display is a device for inputting (or feeding) information or instructions to a computer by touching a prescribed area on a touch screen (or a touch sensitive panel) with an input means such as a finger or a pen (a digital pen or a stylus). According to the position detection method, the touch screen display can be classified into an optical system, an ultrasonic-wave system, a capacitive system, a resistive system, and other systems. Among these systems, the capacitive system detects the location of the touch using a change in capacitance. Considering excellent functionality, a projected capacitive touch screen display of ITO grid system is now being used for mobile devices and is receiving a lot of attention. The mobile devices include a smartphone, a mobile phone, an electronic paper, a tablet personal computer (PC), a pen tablet (or a graphics tablet), and a game console. Among the capacitive touch screen displays, a pen-input touch screen display which uses a pen as an input means, is also now being widely used and being increasingly applied for a smartphone, an electronic paper, a tablet PC, a pen tablet, a game console, and a PC. The display of the touch screen display is provided with, on a surface thereof, a hardcoat film, an anti-Newton-ring film, a soft film, or other films according to purposes. Nowadays, a pen-input tablet (or a pen tablet) as a pointing device for computer is also in widespread use. The pen tablet and the above-mentioned touch screen display are referred to as a pen-input device. Moreover, the following are also developed: a high-resolution (4K) touch screen television having a pixel dimension (or pixel number) four times as large as that of a full high-definitions television, and a high-resolution pen-input device that is used in the architectural field or the medical field. For these devices, a high transparency is also required. As pen-input devices are widely used for various purposes, these devices require higher functions for a comfortable writing experience (or writing comfort) in pen input (or an input operation with a digital or stylus pen).

Japanese Patent Application Laid-Open Publication No. 2010-153298 (JP-2010-153298A, Patent Document 1) discloses a transparent conductive laminate film for a touch screen; the laminate film is excellent in touch feeling with a finger and comprises, in sequence, a hardcoat layer, a substrate consisting of a polyester film, and a transparent conductive layer consisting of a metal oxide; the hardcoat layer has an average area surface roughness of 0.08 to 0.30 µm, an average friction coefficient MIU of KES surface friction characteristic value of 0.13 to 0.17, and a fluctuation MMD of friction coefficient of 0.006 to 0.015.

However, in this document is also described neither a pen-input touch screen nor a comfortable writing experience in pen input. Furthermore, use of this laminate for a touch screen would offer an uncomfortable writing experience in pen input, which is far from a comfortable writing experience such as a pencil writing experience.

Japanese Patent Application Laid-Open Publication No. 2014-97649 (JP-2014-97649A, Patent Document 2) discloses a transparent film for use on a display of a pen-input touch screen with an improved comfortable writing experience in pen input on a surface of the display; the transparent film contains a transparent substrate film and a coat layer disposed on at least one side of the transparent substrate film and has a total light transmittance of not less than 85% in accordance with Japanese Industrial Standards (JIS) K7136, and the coat layer has a surface texture with a maximum height of rolling circle waviness profile ($W_{EM}$) in accordance with JIS B0610 of not less than 15 µm.

Unfortunately, the transparent film offers an improved comfortable writing experience in pen input, while the film wears out a pen tip severely. If the comfortable writing experience in pen input is controlled by an uneven surface profile (or texture) of the film, the pen tip would easily be worn off due to the uneven profile. Thus, the comfortable writing experience in pen input and the reduced abrasion (or wear) of the pen tip are in a trade-off relationship, and it is difficult to achieve compatibility.

CITATION LIST

Patent Literature

Patent Document 1: JP-2010-153298A (claim 1, paragraphs [0001], [0004], and [0006])

Patent Document 2: JP-2014-97649A (claim 1, paragraphs [0001] and [0013])

SUMMARY OF INVENTION

Technical Problem

It is therefore an object of the present invention to provide a transparent laminate film which offers a comfortable writing experience in pen input (or an input operation with a digital or stylus pen) and which reduces or prevents abrasion of a pen tip.

Another object of the present invention is to provide a transparent laminate film which is excellent in optical characteristics such as transparency and which improves visibility of a display.

It is still another object of the present invention is to provide a transparent laminate film having a high hardness and a high abrasion resistance.

Solution to Problem

The present inventor of the present invention has made intensive studies to achieve the above objects and has finally found that both improved comfortable writing experience in pen input and reduced abrasion of a pen tip are achievable by combination of a substrate layer and a coat layer having a surface with a maximum height of rolling circle waviness profile ($W_{EM}$) of 5 to 15 µm and an arithmetic average roughness (Ra) of not less than 0.5 µm. The present invention has been accomplished based on the above findings.

That is, an aspect of the present invention provides a transparent laminate film comprising a substrate layer and a coat layer; the coat layer has a surface (or a surface profile or texture) with a maximum height of rolling circle waviness profile ($W_{EM}$) in accordance with Japanese Industrial Standards (JIS) B0610 of 5 to 15 μm and an arithmetic average roughness (Ra) of not less than 0.5 μm. The coat layer may have the surface with the arithmetic average roughness (Ra) of 0.5 to 5 μm. The coat layer may contain particles and a binder component. The binder component may comprise a polyfunctional (meth)acrylate, and a urethane (meth)acrylate and/or a thermoplastic elastomer. In an aspect of the present invention, the transparent laminate film may have a total light transmittance of not less than 85% and a haze of 1 to 30%. In an aspect of the present invention, the transparent laminate film may be disposed on a surface of a display of a pen-input device. The display may be a transmissive display. The pen-input device may use a pen having a plastic pen tip.

Advantageous Effects of Invention

In the present invention, the coat layer having a surface with a maximum height of rolling circle waviness profile ($W_{EM}$) of 5 to 15 μm and an arithmetic average roughness (Ra) of not less than 0.5 μm is combined with the substrate layer, and the transparent laminate film having such a combination provides both improved comfortable writing experience in pen input (for example, a writing experience like a pencil-on-paper writing experience) and reduced abrasion (or wear) of the pen tip. Moreover, for example, addition of a small amount of particles having a narrow particle size distribution and a relatively large particle size to the coat layer improves the optical characteristics, such as transparency, of the film and reduces the haze thereof. Thus, such a transparent laminate film improves the visibility of a display and is effectively utilizable for a transmissive display. Further, use of a polyfunctional (meth)acrylate (a cured product of a polyfunctional (meth)acrylate) as a binder component of the coat layer improves hardness and abrasion resistance.

DESCRIPTION OF EMBODIMENTS

A transparent laminate film according to an embodiment of the present invention is a film for being disposed on a display surface of a pen-input device, and comprises a substrate layer and a coat layer.

[Substrate Layer]

The substrate layer is formed with a transparent material. The transparent material can be selected according to purposes and may be an inorganic material, such as a glass. In light of strength, formability (moldability), or other characteristics, an organic material may practically be used. The organic material may be a curable resin. From the point of view of formability or other characteristics, a thermoplastic resin is preferred. The thermoplastic resin may include, for example, a polyolefin, a styrenic resin, an acrylic resin, a vinyl chloride-series resin, a poly(vinyl alcohol)-series resin, a polyacetal, a polyester (including a polyarylate), a polycarbonate, a polyamide, a polyimide, a polysulfone-series resin, a poly(phenylene ether)-series resin, a poly(phenylene sulfide)-series resin, a fluorocarbon resin, and a cellulose derivative. These thermoplastic resins may be used alone or in combination. A transparent laminate film having a substrate layer composed of a transparent thermoplastic resin is usable for an application that requires transparency, for example, a display of a pen-input device such as a touch screen display.

Among these thermoplastic resins, a preferred resin includes a cyclic polyolefin, a polyester, a poly(methyl methacrylate)-series resin, a bisphenol A-based polycarbonate, a cellulose ester, or other resins. The cellulose ester and the polyester are particularly preferred.

The cellulose ester may include, for example, a cellulose acetate [such as a cellulose triacetate (TAC)] and a cellulose acetate $C_{3-4}$acylate (such as a cellulose acetate propionate or a cellulose acetate butyrate). The polyester may include, for example, a poly(alkylene arylate), such as a poly(ethylene terephthalate) (PET) or a poly(ethylene naphthalate) (PEN).

Among them, in light of well-balanced various characteristics, a poly($C_{2-4}$alkylene arylate), such as a PET or a PEN, is preferred. Considering heat resistance, a poly($C_{2-4}$alkylene naphthalate) resin, such as a PEN, is particularly preferred. Further, the substrate layer formed with the organic material may be a biaxially stretched film.

The substrate layer formed with the organic material may optionally contain any commonly used additive that does not damage transparency. The additive may include, for example, a curing agent or a crosslinking agent, other resin components, a stabilizer (such as an antioxidant, an ultraviolet absorber, a light stabilizer, or a heat stabilizer), a filler, a coloring agent, a nucleation agent, a plasticizer, a flame retardant, a flame-retardant auxiliary, an antistatic agent, a dispersing agent, a surfactant, a wax, and an antibacterial agent. These additives may be used alone or in combination. The proportion of the additive in the substrate layer is, for example, about 0.01 to 10% by weight (in particular, about 0.1 to 5% by weight). The substrate layer may contain a granular (or particulate) filler. From the point of view of reduction of internal haze, the substrate layer is preferably free from a granular filler (or a fine particle). The substrate layer is also preferably free from an additive of a size larger than a light wavelength.

The average thickness of the substrate layer is not limited. In light of easiness to handle or other characteristics, the substrate layer may have an average thickness of not less than 10 μm, for example, about 12 to 500 μm, preferably about 20 to 300 μm, and more preferably about 30 to 200 μm.

[Coat Layer]

The coat layer is usually laminated on at least one side (in particular, one side) of the substrate layer.

(Characteristics of Coat Layer)

The coat layer has an appropriate uneven surface profile (or texture) having both specific maximum height of rolling circle waviness profile ($W_{EM}$) and specific arithmetic average roughness (Ra). This allows both improved comfortable writing experience in pen input and reduced or prevented abrasion of a tip of a pen (as an input means), although these characteristics are in a trade-off relationship and are hardly compatible with each other in the common general technical knowledge.

Specifically, the coat layer has a surface having a maximum height of rolling circle waviness profile ($W_{EM}$) in accordance with JIS B0610 of 5 to 15 μm. The maximum height of rolling circle waviness profile can be selected according to purposes. In applications with an emphasis on a comfortable writing experience, the maximum height of rolling circle waviness profile is, for example, about 5 to 8 μm, preferably about 5.3 to 7 μm, and more preferably about 5.4 to 6.5 μm (particularly about 5.5 to 6 μm); in applications with an emphasis on a reduced abrasion of a pen tip or on optical characteristics, the maximum height of rolling circle waviness profile is, for example, about 5.5 to 14 µm, preferably about 6 to 13 µm, and more preferably about 7 to 12 µm (particularly about 8 to 10 µm). For a pen-input touch screen display, the coat layer having a $W_{EM}$ less than these values may make a pen tip less slippery without sliding, tending to make it difficult to write on; the coat layer having a $W_{EM}$ more than these values may wear out a pen tip significantly.

In this description and claims, the maximum height of rolling circle waviness profile ($W_{EM}$) can be measured in accordance with JIS B0610, more specifically, can be measured by a method described in Examples mentioned below.

Further, the coat layer has a surface having an arithmetic average roughness (Ra) in accordance with JIS B0601 of not less than 0.5 µm (for example, 0.5 to 5 µm). In applications with an emphasis on a comfortable writing experience, the arithmetic average roughness is, for example, about 0.5 to 3 µm, preferably about 0.6 to 2 µm, and more preferably about 0.7 to 1.5 µm (particularly about 0.8 to 1 µm); in applications with an emphasis on a reduced abrasion of a pen tip or on optical characteristics, the arithmetic average roughness is, for example, about 0.5 to 2 µm (e.g., about 0.51 to 1.5 µm), preferably about 0.52 to 1 µm (e.g., about 0.52 to 0.8 µm), and more preferably about 0.52 to 0.7 µm (particularly about 0.53 to 0.6 µm). The coat layer having an Ra more than these values may wear out a pen tip significantly.

In this description and claims, the Ra can be measured by a method in accordance with JIS B0610, more specifically, can be measured by a method described in Examples mentioned below.

The coat layer may have any average thickness (the coat layer may have a flat portion having any average thickness). The average thickness may be not less than 3 µm, for example, about 3 to 50 µm, preferably about 5 to 30 µm, and more preferably about 7 to 20 µm (particularly about 8 to 15 µm). The coat layer having a thickness more than these values may make it difficult to satisfy the above-mentioned surface profile (or texture). The thickness of the coat layer can be determined, for example, as an average value of any 10 points measured by an optical thickness meter.

Non-limiting examples of the process for producing the coat layer having the above-mentioned surface profile (or texture) may include a process using a forming die. In light of convenience, a process using particles is preferred. The coat layer obtained by the process using particles may contain the particles and a binder component.

(Particles)

The material of the particles is not particularly limited to a specific one. The particles may be inorganic particles or organic particles.

The inorganic particles may include, for example, a metal as a simple substance, a metal oxide, a metal sulfate, a metal silicate, a metal phosphate, a metal carbonate, a metal hydroxide, a silicon compound, a fluorine compound, and a natural mineral substance. The inorganic particles may be surface-treated with a coupling agent (a titanium coupling agent, a silane coupling agent). These inorganic particles may be used alone or in combination. Among these inorganic particles, in light of transparency or others, metal oxide particles (such as titanium oxide), silicon compound particles (such as silicon oxide), or fluorine compound particles (such as magnesium fluoride) are preferred; in order to obtain low reflection or low haze, silica particles are particularly preferred.

The organic particles may include, for example, particles of a thermoplastic resin (e.g., a (meth)acrylic) resin, a polyamide resin, a polyamideimide resin, and a polyacetal resin), particles of a crosslinked thermoplastic resin (e.g., a crosslinked polyolefinic resin, a crosslinked (meth)acrylic resin, a crosslinked polystyrene-series resin, and a crosslinked polyurethane resin), and particles of a thermosetting resin (e.g., an epoxy resin). These organic particles may be used alone or in combination. Among these organic particles, widely used particles include thermoplastic resin particles such as polyamide particles, or crosslinked thermoplastic resin particles such as crosslinked poly(meth) acrylate particles, crosslinked polystyrene-series particles, or crosslinked polyurethane particles, or other particles.

Among them, in the coat layer, from the viewpoint of comfortable writing experience in pen input, the organic particles are preferred. In order to obtain well-balanced optical characteristics (such as transparency) and mechanical strength, crosslinked poly(meth)acrylate-series particles are particularly preferred.

The poly(meth)acrylate constituting the crosslinked poly (meth)acrylate particles may include, for example, a poly (alkyl (meth)acrylate) resin containing a poly($C_{1-6}$alkyl (meth)acrylate), such as a poly(methyl (meth)acrylate), a poly(ethyl (meth)acrylate), or a poly(butyl (meth)acrylate) [particularly a poly($C_{2-6}$alkyl (meth)acrylate)] as a main component (in a proportion of about 50 to 100% by weight, preferably about 70 to 100% by weight). The crosslinking agent may include a commonly used crosslinking agent, for example, a compound having two or more ethylenic unsaturated bonds [e.g., a (poly)$C_{2-10}$alkylene glycol di(meth) acrylate (such as ethylene glycol di(meth)acrylate, butanediol di(meth)acrylate, or a poly(ethylene glycol) di(meth) acrylate), a di-functional vinyl compound (such as divinylbenzene), and a tri- or more-functional (poly-functional) vinyl compound (such as trimethylolpropane tri (meth)acrylate)]. The proportion of the crosslinking agent may be about 0.1 to 10% by mol (particularly about 1 to 5% by mol) in the total monomer. In order to improve the sliding property of the coat layer, the crosslinked poly(alkyl (meth) acrylate) particles may include a crosslinked poly(alkyl methacrylate) particles, such as a crosslinked poly(methyl methacrylate) particles. Moreover, the crosslinked poly (alkyl acrylate) particles may be used in order to improve the softness of the coat layer.

In light of improvement in transparency, the particles may have a refraction index of, for example, about 1.4 to 1.6, preferably about 1.41 to 1.58, and more preferably about 1.42 to 1.55 (particularly about 1.45 to 1.53).

The particles preferably have a predetermined hardness. Assuming that the strength at which the particles are compressed by 10% using a micro compression tester represents S10 strength, the particles have the S10 strength of about 0.1 to 10 kgf/mm², preferably about 0.5 to 8 kgf/mm², and more preferably about 1 to 5 kgf/mm² (particularly about 1.5 to 3 kgf/mm²).

The shape of the particles may include a spherical form, an ellipsoidal form, a polygonal form (e.g., a polyangularpyramid form, a cubic form, and a rectangular-prism form), a plate-like form, a rod-like form, and an amorphous form. Among these shapes, in order that a pen tip may moderately catch the coat layer and allow the above-mentioned comfortable writing experience, the particles preferably have a form free from an acutely-angled portion (for example, a spherical form or an ellipsoidal form). In particular, the particles preferably have a truly spherical form or a substantially truly spherical form.

In order to form the above-mentioned surface profile on the coat layer, the size (or diameter) of the particles can suitably be selected depending on a viscosity of a coating liquid for the coat layer. In light of easy formation of the surface profile, the particle size is preferably substantially the same size as the thickness of the coat layer or larger than the thickness of the coat layer. Specifically, the average particle size of the particles can be selected from the range of about 1 to 10 times as large as the thickness of the coat layer. For example, the average particle size of the particles may be about 1.05 to 5 times (e.g., about 1.1 to 3 times), preferably about 1.15 to 2 times, and more preferably about 1.2 to 1.5 times (particularly about 1.25 to 1.4 times) as large as the thickness of the coat layer.

The particles have an average particle size (a number average primary particle size) of, for example, about 8 to 30 μm, preferably about 8.5 to 25 μm, and more preferably about 9 to 20 μm (particularly about 10 to 18 μm). If the average particle size is too small, it is difficult to form the above surface profile; if the average particle size is too large, the coat layer may have a low strength in addition to the difficult formation of the surface profile.

The particles have a maximum particle size of, for example, about not more than 50 μm, preferably about not more than 40 μm, and more preferably about not more than 30 μm (particularly about not more than 27 μm). If the maximum particle size is too large, the writing experience may be less comfortable.

The particles may have any particle size distribution (frequency distribution). In applications with an emphasis on a reduced abrasion of a pen tip or on optical characteristics, the particles may have a particle size distribution having one peak (a narrow particle size distribution) and have a relatively large particle size. The particles may have an average particle size of, for example, about 10 to 20 μm (particularly about 12 to 18 μm).

In applications with an emphasis on a comfortable writing experience, the particles may have a particle size distribution having a plurality of peaks (peaks of frequency distribution). The particles may contain, for example, small particles having a particle size (or a particle diameter) of not less than 6 μm and less than 12.5 μm (particularly 8 to 12 μm) and large particles having a particle size (or a particle diameter) of 12.5 to 20 μm (particularly 13 to 18 μm). The small particles have an average particle size in the range of not less than 6 μm and less than 12.5 μm, for example, an average particle size in the range of about 6.5 to 12 μm, preferably about 7 to 11.5 μm, and more preferably about 9 to 11 μm. The large particles have an average particle size in the range of 12.5 to 20 μm, for example, an average particle size of about 13 to 19 μm, preferably about 13.5 to 18 μm, and more preferably about 14 to 16 μm. Combining the small particles having such a particle size and the large particles having such a particle size makes it possible to provide both the comfortable writing experience and the reduced abrasion of the pen tip.

In the particles containing such small particles and large particles, it is preferred that the average particle size of the small particles be larger than the average thickness of the flat portion of the coat layer. Specifically, the average particle size of the small particles may be larger than the above average thickness by not less than 0.1 μm (e.g., by 0.1 to 5 μm). For example, it is preferred that the average particle size of the small particles be larger than the above average thickness by about 0.3 to 4 μm, preferably about 0.5 to 3 μm, and more preferably about 0.8 to 2 μm (particularly about 0.9 to 1.5 μm). If the average particle size of the small particles is not smaller than the thickness of the flat portion of the coating layer, the writing experience may be less comfortable.

The weight ratio of the small particles relative to the large particles (small particles/large particles) may be, for example, about 10/1 to 1/10, preferably about 5/1 to 1/5, and more preferably about 2/1 to 1/2 (particularly about 1.5/1 to 1/1.5).

In this description and claims, the average particle size, the maximum particle size, and the particle size distribution can be measured using a light obscuration liquid particle counter conforming to JIS B9916, specifically, can be measured according to the method described in after-mentioned Examples.

The proportion of the particles is, for example, about 0.1 to 20% by weight (e.g., 0.2 to 10% by weight), preferably 0.3 to 3% by weight, more preferably about 0.5 to 2% by weight (particularly about 0.8 to 1.5% by weight) in the entire coating layer. The coat layer having too low a proportion of the particles may have a difficulty in satisfying the surface profile. The coat layer having too high a proportion of the particles may have a reduced strength.

(Binder Component)

The coat layer may contain a binder component for fixing the particles. The binder component, which fixes the particles, may include an inorganic binder component or an organic binder component. In light of strong fixation of the particles, or other reasons, the organic binder component is preferred. Further, among the organic binder components, an organic binder component containing at least a polyfunctional (meth)acrylate is particularly preferred in light of excellent film-formability, strong fixation of the particles, and excellent film strength (such as abrasion resistance).

(A) Polyfunctional (Meth)Acrylate

The polyfunctional (meth)acrylate (urethane-bond-free polyfunctional (meth)acrylate) has a plurality of (meth)acryloyl groups and is divided broadly into a difunctional (meth)acrylate and a tri- or more-functional (polyfunctional) (meth)acrylate.

The di-functional (meth)acrylate may include, for example, an alkanediol di(meth)acrylate, such as ethylene glycol di(meth)acrylate or 1,4-butanediol di(meth)acrylate; an alkanepolyol di(meth)acrylate, such as glycerin di(meth)acrylate; a polyalkylene glycol di(meth)acrylate, such as diethylene glycol di(meth)acrylate; a di(meth)acrylate of an adduct of a bisphenol with an $C_{2-4}$alkylene oxide; and a crosslinked cyclic di(meth)acrylate, such as adamantane di(meth)acrylate.

The tri- or more-functional (polyfunctional, e.g., tri- to octa-functional) (meth)acrylate may include an esterification product of a polyhydric alcohol and (meth)acrylic acid, e.g., a trifunctional (meth)acrylate, such as glycerin tri(meth)acrylate, trimethylolethane tri(meth)acrylate, trimethylolpropane tri(meth)acrylate, pentaerythritol tri(meth)acrylate, or tris(2-hydroxyethyl)isocyanurate tri(meth)acrylate; a tetrafunctional (meth)acrylate, such as ditrimethylolpropane tetra(meth)acrylate or pentaerythritol tetra(meth)acrylate; a pentafunctional (meth)acrylate, such as dipentaerythritol penta(meth)acrylate; and a hexafunctional (meth)acrylate, such as dipentaerythritol hexa(meth)acrylate. In these polyfunctional (meth)acrylates, the polyhydric alcohol may be an adduct of an alkylene oxide (for example, a $C_{2-4}$alkylene oxide, such as ethylene oxide or propylene oxide). The average mole number of the alkylene oxides added relative to 1 mol of the polyhydric alcohol can for example be selected from about 0 to 30 mol (in particular, about 1 to 10 mol).

These polyfunctional (meth)acrylates may be used alone or in combination. Among these polyfunctional (meth)acrylates, in light of the strong fixation of the particles in the coat layer as well as the improvement in the abrasion resistance of the surface of the coat layer and the sliding property of the flat portion of the surface of the coat layer, a preferred one includes a polyfunctional (meth)acrylate, for example, a tri- or more-functional such as dipentaerythritol penta(meth)acrylate or dipentaerythritol hexa(meth)acrylate, preferably a tetra- to octa-functional (meth)acrylate and more preferably a penta- to hepta-functional (meth)acrylate.

(B) Soft Binder Component

In order to improve the softness and the film-forming property of the coat layer and to improve the comfortable writing experience and the mechanical strength, the organic binder component may contain a soft binder component in addition to the polyfunctional (meth)acrylate.

The weight ratio of the polyfunctional (meth)acrylate relative to the soft binder component [in particular, a urethane (meth)acrylate and/or a thermoplastic elastomer] (the polyfunctional (meth)acrylate/the soft binder component) can be selected from the range of about 99/1 to 30/70, for example, about 97/3 to 50/50, preferably about 95/5 to 60/40, and more preferably about 90/10 to 70/30 (particularly about 85/15 to 75/25). If the ratio of the soft binder component is too small, the soft binder component may show decrease in effect. If the ratio of the soft binder component is too large, the writing experience may be less comfortable.

As the soft binder component, a conventional soft resin or elastomer may be used, and a urethane (meth)acrylate (B1) and/or a thermoplastic elastomer (B2) are preferred.

(B1) Urethane (Meth)Acrylate

The urethane (meth)acrylate is combined with the polyfunctional (meth)acrylate in order to improve the softness or film-formability of the coat layer, and in addition, to mainly improve the mechanical strength of the coat layer.

The urethane (meth)acrylate may be a urethane (meth)acrylate obtainable by allowing a (meth)acrylate having an active hydrogen atom [for example, a hydroxyalkyl (meth)acrylate] to react with a polyisocyanate (or a urethane prepolymer which is formed by a reaction of a polyisocyanate and a polyol and has a free isocyanate group).

Examples of the polyisocyanate may include an aliphatic polyisocyanate, an alicyclic polyisocyanate, an araliphatic polyisocyanate, an aromatic polyisocyanate, and a polyisocyanate derivative.

The aliphatic polyisocyanate may include, for example, a $C_{2-16}$alkane diisocyanate such as tetramethylene diisocyanate, hexamethylene diisocyanate (HDI), or trimethylhexamethylene diisocyanate. The alicyclic polyisocyanate may include, for example, 1,4-cyclohexane diisocyanate, isophorone diisocyanate (IPDI), 4,4'-methylenebis(cyclohexyl isocyanate), hydrogenated xylylene diisocyanate, and norbornane diisocyanate. The araliphatic polyisocyanate may include, for example, xylylene diisocyanate (XDI) and tetramethylxylylene diisocyanate. The aromatic polyisocyanate may include, for example, phenylene diisocyanate, 1,5-naphthylene diisocyanate (NDI), diphenylmethane diisocyanate (MDI), tolylene diisocyanate (TDI), 4,4'-toluidine diisocyanate, and 4,4'-diphenyl ether diisocyanate. The polyisocyanate derivative may include, for example, a multimer (such as a dimer or a trimer), biuret, an allophanate, a carbodiimide, and a uretdione. These polyisocyanates may be used alone or in combination.

Among these polyisocyanates, in light of heat resistance, durability, or other characteristics, a preferred one includes a non-yellowing-type diisocyanate or a derivative thereof, for example, a non-yellowing diisocyanate or a derivative thereof, such as an aliphatic diisocyanate (e.g., HDI) or an alicyclic diisocyanate (e.g., IPDI and hydrogenated XDI), in particular, a trimer of an aliphatic diisocyanate (e.g., a trimer having an isocyanurate ring). These polyisocyanates may be used alone or in combination.

As the polyol, a polymer polyol is practically used. The polymer polyol may include a polymer polyol such as a polyester polyol, a polyether polyol, a polyetherester polyol, or a polycarbonate polyol.

The polyester polyol may be, for example, a reaction product of a polycarboxylic acid (or an anhydride thereof) and a polyol, or may be a reaction product obtainable by ring-opening addition polymerization of a lactone to an initiator.

As the polycarboxylic acid, there may be mentioned a dicarboxylic acid [for example, an aromatic dicarboxylic acid or an anhydride thereof (such as terephthalic acid, isophthalic acid, or phthalic anhydride), an alicyclic dicarboxylic acid or an anhydride thereof (such as tetrahydrophthalic anhydride, or het anhydride), and an aliphatic dicarboxylic acid or an anhydride thereof (a $C_{4-20}$alkanedicarboxylic acid (anhydride) such as succinic acid (anhydride), adipic acid, or sebacic acid)], or an alkyl ester of such a dicarboxylic acid. Among these polycarboxylic acids, an aliphatic dicarboxylic acid or an anhydride thereof (e.g., a $C_{6-20}$alkanedicarboxylic acid such as adipic acid, azelaic acid, or sebacic acid) is preferred. These polycarboxylic acids may be used alone or in combination.

The polyol may include a diol, for example, an aliphatic diol [e.g., an alkanediol (a $C_{2-22}$alkanediol, such as ethylene glycol, propylene glycol, trimethylene glycol, 1,4-butanediol, 1,5-pentanediol, neopentyl glycol, or 1,6-hexanediol)], an alicyclic diol [e.g., a cycloalkanediol (such as 1,4-cyclohexanediol or 1,4-cyclohexane dimethanol), a hydrogenated bisphenol (such as hydrogenated bisphenol A), or a $C_{2-4}$alkylene oxide adduct thereof], and an aromatic diol [e.g., an araliphatic diol (such as xylylene glycol), a bisphenol (such as bisphenol A, bisphenol S, or bisphenol F), or an $C_{2-4}$alkylene oxide adduct thereof]. These polyols may be used alone or in combination. Among these polyols, from the point of view of stability or other characteristics, an aliphatic diol and an alicyclic diol are preferred.

The lactone may include, for example, a $C_{3-10}$lactone such as butyrolactone, valerolactone, caprolactone, or enantholactone. These lactones may be used alone or in combination. Among these lactones, a $C_{4-8}$lactone such as valerolactone or caprolactone is preferred.

Examples of the initiator to the lactone may include water, a homopolymer or copolymer of an oxirane compound (for example, a poly(ethylene glycol) and a poly(tetramethyleneether glycol)), a low molecular weight polyol (e.g., an alkanediol such as ethylene glycol, trimethylolpropane, glycerin, pentaerythritol, and bisphenol A), and a compound having an amino group (for example, a diamine compound such as ethylenediamine, hexamethylenediamine, hydrazine, xylylenediamine, or isophoronediamine). These initiators may be used alone or in combination.

The polyether polyol may include, for example, a ring-opening polymerization product or copolymer of the oxirane compound [for example, a poly($C_{2-4}$alkylene glycol), such as a poly(ethylene glycol), a poly(propylene glycol), a poly(trimethyleneether glycol), or a poly(tetramethyleneether glycol)] and an adduct of bisphenol A or hydrogenated bisphenol A with an alkylene oxide. These polyether polyols may be used alone or in combination.

The polyetherester polyol may include, for example, a polyetherester polyol which is a polymer of the dicarboxylic acid (such as an alicyclic dicarboxylic acid or an aliphatic dicarboxylic acid) or the dialkyl ester thereof and the polyether polyol.

The polycarbonate polyol may include, for example, a polymer of a glycol and a carbonate or phosgene. The glycol may include one or more glycols selected from the group consisting of an alkanediol (e.g., ethylene glycol and 1,4-butanediol), a (poly)oxyalkylene glycol (e.g., diethylene glycol), an alicyclic diol (e.g., 1,4-cyclohexanediol, 1,4-cyclohexane dimethanol, and hydrogenated bisphenol A), and an aromatic diol [e.g., a bisphenol (such as bisphenol A) or an adduct of a bisphenol with an alkylene oxide]. The carbonate may include dimethyl carbonate, ethylene carbonate, and diphenyl carbonate.

Among these polymer polyols, the polyester polyol, the polyether polyol, and the polycarbonate polyol are widely used. In light of excellent durability, and softness, the polyester polyol and the polyether polyol are particularly preferred.

The urethane prepolymer may include, for example, a multimer of the polyisocyanate, a biuret-modified multimer of the polyisocyanate, an adduct of the polyisocyanate and the polyol, and a polyurethane prepolymer obtainable by allowing the polyol to react with an excessive amount of the polyisocyanate. These prepolymers may be used alone or in combination.

A preferred urethane prepolymer may include, for example, a multimer (such as a trimer, a pentamer, or a heptamer) of the polyisocyanate, a biuret multimer (biuret-modified product) of the polyisocyanate, an adduct of the polyisocyanate and the polyol (a triol such as glycerin or trimethylolpropane), a polyurethane prepolymer of the diisocyanate and the polyester polyol, and a polyurethane prepolymer of the diisocyanate and the polyether polyol, in particular, a polyurethane prepolymer of the diisocyanate and the polyether polyol or the polyester polyol.

The (meth)acrylate having an active hydrogen atom may include, for example, a hydroxy$C_{2-6}$alkyl (meth)acrylate such as 2-hydroxyethyl (meth)acrylate or 2-hydroxypropyl (meth)acrylate; a hydroxyalkoxy$C_{2-6}$alkyl (meth)acrylate such as 2-hydroxy-3-methoxypropyl (meth)acrylate; pentaerythritol tri(meth)acrylate; and a dipentaerythritol poly(meth)acrylate.

The number of (meth)acryloyl groups per molecule of the urethane (meth)acrylate is not less than 2. From the point of view of mechanical strength or other characteristics, the number of (meth)acryloyl groups is, for example, about 2 to 8, preferably about 2 to 6, and more preferably about 2 to 4 (particularly, about 3 to 4).

In particular, from the point of view of excellent stability (such as weatherability) and softness, the urethane (meth)acrylate may preferably include an aliphatic urethane (meth)acrylate, and an alicyclic urethane (meth)acrylate, or others. For example, the urethane (meth)acrylate may be a polyester-based urethane (meth)acrylate obtainable from an aliphatic diisocyanate.

The urethane (meth)acrylate is produced by combining a polyisocyanate and a (meth)acrylate having an active hydrogen atom, usually, at a ratio in which the isocyanate group and the active hydrogen atom are substantially equivalent (isocyanate group/active hydrogen atom (molar ratio) is about 0.8/1 to 1.2/1). Processes for producing these urethane (meth)acrylates may be referred to Japanese Patent Application Laid-Open Publication No. 2008-74891, or other references. The tri- or more-functional (polyfunctional) urethane (meth)acrylate may be a urethane (meth)acrylate obtainable from a polyol such as trimethylolpropane, pentaerythritol, or dipentaerythritol.

The weight-average molecular weight of the urethane (meth)acrylate is not limited. In light of improvement in the comfortable writing experience, the urethane (meth)acrylate may have a weight-average molecular weight of not less than 500, for example, about 500 to 10000, preferably about 600 to 9000, and more preferably about 700 to 8000 (particularly about 1000 to 5000) in terms of polystyrene in gel permeation chromatography (GPC). A urethane (meth)acrylate having an excessively low molecular weight may show decrease in effect. A urethane (meth)acrylate having an excessively high molecular weight may reduce the film-formability or handleability.

(B2) Thermoplastic Elastomer

The thermoplastic elastomer is combined with the polyfunctional (meth)acrylate in order to improve the softness or film-formability of the coat layer, and in addition, to mainly improve the comfortable writing experience.

The thermoplastic elastomer may include, for example, a styrene-series elastomer, an olefinic elastomer, a polyester-series elastomer, and a polyamide-series elastomer. In light of adhesion, flexibility (or softness), or other characteristics, a thermoplastic polyurethane elastomer is preferred. The thermoplastic polyurethane elastomer can be obtained by a reaction of a polyisocyanate and a polyol and optionally a chain-elongation agent (or chain-extension agent).

As the polyisocyanate, there may be used a polyisocyanate as exemplified in the paragraph of the urethane (meth)acrylate (B1), and others. For example, a preferred one may include a non-yellowing diisocyanate or a derivative thereof, e.g., an aliphatic diisocyanate (such as hexamethylene diisocyanate (HDI)) and an alicyclic diisocyanate [such as isophorone diisocyanate (IPDI) or hydrogenated xylylene diisocyanate (hydrogenated XDI)]. In particular, a trimer of an aliphatic diisocyanate (e.g., a trimer having an isocyanurate ring) may preferably be used.

As the polyol, there may be used a polymer polyol as exemplified in the paragraph of the urethane (meth)acrylate (B1), and others. In general, a polyether polyol or a polyester polyol is practically used.

As the chain-elongation agent, there may be used a conventional chain-elongation agent. For example, a preferably available chain-elongation agent may include a diol (e.g., an alkanediol, such as ethylene glycol or 1,4-butanediol) and a diamine (e.g., tetramethylenediamine and hexamethylenediamine).

The thermoplastic polyurethane elastomer may be an elastomer containing a hard segment (hard block) and a soft segment (soft block); the hard segment may contain a polyurethane of a short-chain diol and a diisocyanate, and the soft segment may contain a polyurethane of a polymer diol (such as a polyester diol, a polyether diol, or a polycarbonate diol) and a diisocyanate. The polyurethane elastomer is usually classified into a polyester-based polyurethane elastomer, a polyether-based polyurethane elastomer, a polycarbonate-based polyurethane elastomer, and others, according to the species of the polymer diol constituting the soft segment.

Among these thermoplastic polyurethane elastomers, in light of softness, stability, or others, a preferred one may include a polyester-based polyurethane elastomer and a polyether-based polyurethane-series elastomer (in particular, a polyester-based polyurethane-series elastomer containing a non-yellowing diisocyanate).

The thermoplastic polyurethane elastomer may be modified with a silicone component. The silicone component may be contained in the elastomer or may be copolymerized with a monomer constituting the elastomer. The silicone component is usually formed from an organosiloxane unit [—Si(—R)$_2$—O—] (wherein the group R represents a substituent). The substituent represented by the group R may include an alkyl group (such as methyl group), an aryl group (such as phenyl group), a cycloalkyl group, and others. The proportion of the silicone component in the whole silicone-modified polyurethane elastomer is about not more than 60% by weight, for example, about 0.1 to 50% by weight, preferably about 1 to 40% by weight, and more preferably about 2 to 30% by weight (particularly about 3 to 20% by weight).

The thermoplastic elastomer (in particular, a thermoplastic polyurethane elastomer) may have a number-average molecular weight of, for example, about 10,000 to 500,000, preferably about 20,000 to 300,000, and more preferably about 30,000 to 100,000 in terms of polystyrene in GPC.

(C) Cellulose Derivative

The organic binder component may contain a cellulose derivative in addition to the polyfunctional (meth)acrylate and the soft binder in order to improve the softness or the film-formability of the coat layer. The cellulose derivative is particularly useful in a case where the soft binder is a urethane (meth)acrylate. The cellulose derivative may include a cellulose ester, a cellulose ether, and a cellulose carbamate.

The cellulose ester may include, for example, an aliphatic organic acid ester of a cellulose (e.g., a cellulose $C_{2-6}$acylate such as a cellulose acetate (e.g., a cellulose diacetate and a cellulose triacetate), a cellulose propionate, a cellulose butyrate, a cellulose acetate propionate, or a cellulose acetate butyrate), an aromatic organic acid ester of a cellulose (e.g., a $C_{7-12}$aromatic carboxylic acid ester of a cellulose such as a cellulose phthalate or a cellulose benzoate), and an inorganic acid ester of a cellulose (e.g., a cellulose phosphate and a cellulose sulfate). The cellulose ester may be a mixed acid ester of a cellulose such as a cellulose acetate nitrate.

As the cellulose ether, for example, there may be mentioned a cyanoethylcellulose; a hydroxy$C_{2-4}$alkyl cellulose such as a hydroxyethyl cellulose or hydroxypropyl cellulose; a $C_{1-6}$alkyl cellulose such as a methyl cellulose or an ethyl cellulose; a carboxymethyl cellulose or a salt thereof, a benzyl cellulose, and an acetyl alkyl cellulose. The cellulose carbamate may include, for example, a cellulose phenylcarbamate.

These cellulose derivatives may be used alone or in combination. Among these cellulose derivatives, a cellulose ester, particularly, a cellulose $C_{2-6}$acylate (e.g., a cellulose diacetate, a cellulose triacetate, a cellulose propionate, a cellulose butyrate, a cellulose acetate propionate, and a cellulose acetate butyrate) is preferred. In particular, a cellulose $C_{2-4}$acylate such as a cellulose diacetate, a cellulose acetate propionate, or a cellulose acetate butyrate (particularly, a cellulose acetate$C_{3-4}$acylate such as a cellulose acetate propionate) is preferred in terms of easy preparation of a coating composition due to a high solubility in a solvent, or other reasons.

The ratio of the cellulose derivative (C) relative to 100 parts by weight of the total amount of the polyfunctional (meth)acrylate (A) and the soft binder component (B) is about 0.1 to 30 parts by weight, preferably about 1 to 20 parts by weight, and more preferably about 3 to 15 parts by weight (particularly about 5 to 10 parts by weight). If the ratio of the cellulose derivative is too small, the cellulose derivative may show decrease in effect. If the ratio of the cellulose derivative is too large, the strength of the coat layer may be reduced.

(D) Other Additives

The coat layer may contain other binder components. Examples of other binder components may include a monofunctional (meth)acrylate [e.g., (meth)acrylic acid; an alkyl (meth)acrylate such as methyl (meth)acrylate; a cycloalkyl (meth)acrylate such as cyclohexyl (meth)acrylate; and a crosslinked cyclic (meth)acrylate such as dicyclopentanyl (meth)acrylate, dicyclopentenyl (meth)acrylate, dicyclopentenyloxyethyl (meth)acrylate, bornyl (meth)acrylate, isobornyl (meth)acrylate, or tricyclodecanyl (meth)acrylate], another vinyl-series compound [such as styrene or vinylpyrrolidone], a two- or more-functional oligomer or resin [e.g., an epoxy (meth)acrylate, a polyester (meth)acrylate, and a silicone (meth)acrylate], another thermoplastic resin, a water-soluble polymer, or other components.

The other binder components may be used alone or in combination. The ratio of the above other binder components relative to 100 parts by weight of the total amount of the polyfunctional (meth)acrylate (A) and the soft binder component (B) is not more than 50 parts by weight, for example, about 0.1 to 30 parts by weight (particularly about 1 to 10 parts by weight).

In a case where the binder component contains the polyfunctional (meth)acrylate, the coat layer may contain a polymerization initiator. The polymerization initiator may be a thermal polymerization initiator [a thermal radical generator, such as a peroxide (e.g., benzoyl peroxide)] or may be a photopolymerization initiator (a photo radical generator). A preferred polymerization initiator includes a photopolymerization initiator. The photopolymerization initiator may include, for example, an acetophenone compound or propiophenone compound, a benzil compound, a benzoin compound, a benzophenone compound, a thioxanthone compound, and an acylphosphine oxide compound. The photopolymerization initiator may contain a commonly used photosensitizer or photopolymerization accelerator (for example, a tertiary amine). The ratio of the photopolymerization initiator relative to 100 parts by weight of the polyfunctional (meth)acrylate may be about 0.1 to 20 parts by weight, preferably about 0.5 to 10 parts by weight, and more preferably about 1 to 8 parts by weight (particularly about 1 to 5 parts by weight).

If necessary, the coat layer may further contain a conventional additive, for example, another particle, a stabilizer (e.g., an antioxidant, an ultraviolet absorber, a light stabilizer, and a heat stabilizer), a surfactant or a dispersing agent, an antistatic agent, a plasticizer, a viscosity modifier, a thickener, an antifoaming agent, a flame retardant, a flame-retardant auxiliary, a filler, an impact modifier, a crosslinking agent, a coupling agent, a coloring agent, a lubricant, a wax, a preservative, an antibacterial agent, or others. These additives may be used alone or in combination.

The binder component containing the polyfunctional (meth)acrylate may be a thermosetting composition or may be a photo-curable compound that can harden in a short time, for example, an ultraviolet-curable compound and an EB-curable compound. In particular, a practically usable composition includes an ultraviolet-curable resin.

[Transparent Laminate Film]

In an embodiment of the present invention, the transparent laminate film has excellent optical characteristics such as transparency. The transparent laminate film has a total light transmittance at a thickness of 100 μm of not less than 70%

(for example, about 70 to 100%), for example, not less than 80% (for example, about 80 to 99%), preferably not less than 85% (for example, about 85 to 98%), and more preferably about 88 to 97% (particularly about 90 to 95%), in accordance with Japanese Industrial Standards (JIS) K7361.

In an embodiment of the present invention, the transparent laminate film has, for example, a haze at a thickness of 100 μm in accordance with JIS K7136 of about not more than 40%, for example, about 0.1 to 40% (e.g., about 1 to 30%), preferably about 1 to 38%, and more preferably about 3 to 35% (particularly about 5 to 30%). In particular, for applications which require a high visibility, such as a transmissive display, it is preferred that the film have a low haze, for example, about 1 to 25%, preferably about 3 to 20%, and more preferably about 4 to 15% (particularly about 5 to 10%). The haze larger than these values may reduce the transparency or visibility.

The transparent laminate film may further have other functional layers, for example, a functional layer such as a transparent conductive layer, an anti-Newton-ring layer, an anti-glare layer, a light-scattering layer, an anti-reflection layer, a polarizing layer, or an optical retardation layer (or a phase layer).

In an embodiment of the present invention, the transparent laminate film is disposed on displays (or a display screens) of various display apparatuses. Among them, the transparent laminate film, which provides a comfortable writing experience in pen input, is usable for a pen-input device such as a pen-input touch screen display or a pen tablet, where the film is preferably disposed on the outermost side of a display screen of the device. In a particular embodiment of the present invention, the transparent laminate film, which has an excellent transparency and a comfortable writing experience and achieves a reduced abrasion of the pen tip, is suitable for displays of various pen-input touch screen displays (in particular, a projected capacitive touch screen display of ITO grid system).

The tip of the pen (contactor) for the pen-input device is made of a hard material (such as a plastic or a metal), and is preferably made of a plastic considering significant reduction (or prevention) of abrasion. In light of strength or durability, the plastic may include, for example, a polyethylene-series resin, a polyacetal resin, an aromatic polyester resin, a polyamide resin, a polycarbonate resin, a poly (phenylene ether) resin, a poly(phenylene sulfide) resin, and a polysulfone-series resin. These resins may be used alone or in combination. These resins may contain other resins such as an elastomer or may contain a filler such as a fiber. Among them, a preferred one includes a polyolefin (such as a polyethylene), a polyacetal resin (such as a polyoxymethylene), and a fiber-containing polyester, from the viewpoint of lightness in weight, high strength, excellent durability (such as abrasion resistance) or sliding property. The shape of the pen tip is not limited. The pen tip usually has a curved surface (a rounded shape). The average diameter of the pen tip is not limited. The average diameter of the pen tip can be selected from the range of, for example, about 0.1 to 10 mm and is preferably about 0.3 to 8 mm, and more preferably about 0.3 to 5 mm. The pen (or digital or stylus pen) may be a pen with a fine point (or a fine-point pen), and the average diameter of the pen tip may be, for example, about 0.2 to 2 mm and preferably about 0.3 to 1.5 mm (particularly about 0.5 to 1 mm). In an embodiment of the present invention, the transparent laminate film allows a comfortable writing experience in spite of an input operation with such a fine-point pen, like a pencil-on-paper writing experience.

[Process for Producing Transparent Laminate Film]

In an embodiment of the present invention, the transparent laminate film can be produced by a commonly used process that is not limited to particular processes. For example, the transparent laminate film can be produced through a step of coating a substrate layer with a curable composition for forming a coat layer and a step of curing the curable composition.

In the coating step, the method of applying (or coating) may include a conventional method, for example, a roll coater, an air knife coater, a blade coater, a rod coater, a reverse coater, a bar coater, a comma coater, a dip and squeeze coater, a die coater, a gravure coater, a microgravure coater, a silkscreen coater, a dipping method, a spraying method, and a spinner method. Among these methods, a bar coater or a gravure coater is practically used. If necessary, the curable composition may be applied a plurality of times.

In light of coatability or others, it is preferred that the curable composition forming the coat layer contain a solvent. The solvent can be selected according to the species and solubility of the binder component. It is sufficient that at least a solid content can be uniformly dissolved in the solvent. The solvent may include, for example, a ketone, an ether, a hydrocarbon, an ester, water, an alcohol, a cellosolve, a sulfoxide, and an amide. These solvents may be used alone or in combination. The solvent may be a mixed solvent. Among these solvents, a practically used one includes an alcohol (such as isopropanol) and an aromatic hydrocarbon (such as toluene). The curable composition has a solid content of, for example, about 1 to 90% by weight, preferably about 10 to 80% by weight, and more preferably about 30 to 70% by weight.

In a case where the coated curable composition contains the solvent, the curable composition may optionally be dried to remove the solvent. The solvent may be removed by natural drying or by heat drying. The heating temperature may be about 40 to 150° C., preferably about 50 to 120° C., and more preferably about 60 to 100° C.

In the curing step, the curable composition may be cured by heating according to the species of the polymerization initiator, and can usually be cured by irradiation with an active energy ray (or actinic ray). As the active energy ray, for example, there may be used a radioactive ray (such as gamma ray or X-ray), an ultraviolet ray, a visible ray, and an electron beam (EB). The active energy ray is usually an ultraviolet ray or an electron beam in practical cases.

For the ultraviolet ray, the light source may include, for example, a Deep UV lamp, a low-pressure mercury lamp, a high-pressure mercury lamp, a superhigh-pressure mercury lamp, a halogen lamp, and a laser light source (a light source, such as a helium-cadmium laser or an excimer laser). The quantity of the irradiation light (irradiation energy) varies depending on the thickness of the coating. The quantity of the irradiation light may for example be about 50 to 10000 $mJ/cm^2$, preferably about 70 to 7000 $mJ/cm^2$, and more preferably about 100 to 5000 $mJ/cm^2$.

For the electron beam, an exposure source (e.g., an electron beam irradiation apparatus) can be used for the electron beam irradiation. The radiation dose (dose) varies depending on the thickness of the coating. The radiation dose is, for example, about 1 to 200 kGy (kilogray), preferably about 5 to 150 kGy, and more preferably about 10 to 100 kGy (particularly about 20 to 80 kGy). The acceleration voltage is, for example, about 10 to 1000 kV, preferably about 50 to 500 kV, and more preferably about 100 to 300 kV.

The irradiation with the active energy ray may optionally be conducted in an atmosphere of an inactive gas (for example, nitrogen gas, argon gas, and helium gas).

In order to improve the adhesion of the coat layer to the substrate layer, the substrate layer may be subjected to a surface treatment. The surface treatment may include a conventional surface treatment, for example, a corona discharge treatment, a flame treatment, a plasma treatment, and an ozone or ultraviolet ray irradiation treatment. The surface of the substrate layer may be subjected to an easy-adhesion treatment.

EXAMPLES

The following examples are intended to describe this invention in further detail and should by no means be interpreted as defining the scope of the invention. The transparent laminate films obtained in Examples and Comparative Examples were evaluated for the following items.

[Thickness of Coat Layer (Flat Portion)]

The thickness of the coat layer was measured at any 10 points using an optical thickness meter, and the average value was calculated.

[Haze and Total Light Transmittance]

Using a haze meter (trade name "NDH-5000W" manufactured by Nippon Denshoku Industries Co., Ltd.), the total light transmittance was measured in accordance with JIS K7361 and the haze was measured in accordance with JIS K7136. The transparent laminate film was disposed so as to face the coat layer toward a beam receiver, and the measurement of the haze was carried out.

[Arithmetic Average Roughness Ra]

In accordance with JIS B0601, the arithmetic average roughness Ra was measured using a surface texture and contour measuring instrument ("SURFCOM 570A" manufactured by Tokyo Seimitsu Co., Ltd.).

[Maximum Height of Rolling Circle Waviness Profile ($W_{EM}$)]

In accordance with JIS B0610, the maximum height of rolling circle waviness profile ($W_{EM}$) was measured using a surface texture and contour measuring instrument ("SURFCOM 570A" manufactured by Tokyo Seimitsu Co., Ltd.) under the following conditions.

Stylus: Waviness (0102505)
Specification of stylus: 800 μmR, ruby
Driving speed: 3 mm/s
λf reduction cut-off value: 8 mm
Measuring length: 15 mm

[Pencil Hardness]

The pencil hardness was measured by applying a load of 7.4 N in accordance with JIS K5400.

[Steel Wool (SW) Durability]

Using a steel wool durability tester provided with a stick 1.0 cm in diameter covered with a #0000 steel wool, the steel wool was allowed to go back and forth on the surface of the coat layer 10 times (at velocity: 10 cm/s) under a constant load (a load of 100 g). Then the transparent laminate film was attached to a black acrylic plate with the use of an optical agglutinant. The state of the surface was observed under the light of a fluorescent tube provided with a three-band fluorescent lamp, and the number of scratches was counted. The SW durability was evaluated on the basis of the following criteria.

A: No scratches appear.
B: One or two scratches appear.
C: Three or more scratches appear.

[Pen Tip Abrasion Resistance]

Using a sliding tester for touch panel, a digital pen for Nintendo DS (registered trademark), which is a mobile game machine, was allowed to go back and forth 50 mm on the sample 10000 times under a load of 500 g. Thereafter, the abrasion length of the pen tip was measured.

[Comfortable Writing Experience]

The surface of the coat layer was evaluated for a comfortable writing experience with a digital pen for Nintendo DS (registered trademark) by 8 subjects on the basis of the following criteria.

A: Five or more subjects judged the film to be comfortable to write on, similar to a pencil-on-paper writing experience.

B: Four or less subjects judged the film to be comfortable to write on, similar to a pencil-on-paper writing experience.

[Material]

Transparent PET substrate film: "A4300" manufactured by Toyobo Co., Ltd., thickness: 100 μm Hardcoat film A: "KB film N10" manufactured by Kimoto Co., Ltd.

Hardcoat film B: "KB film N30" manufactured by Kimoto Co., Ltd.

Polyfunctional acrylate: polyfunctional acrylic UV-curable monomer (dipentaerythritol penta- to hexa-acrylate, "DPHA" manufactured by Daicel-Allnex Ltd.

Urethane acrylate: polyfunctional urethane acrylate, "PU3210" manufactured by Miwon Specialty Chemical Co., Ltd.

Urethane elastomer: polyurethane elastomer, "DAIALLOMER EX002" manufactured by Dainichiseika Color & Chemicals Mfg. Co., Ltd.

Cellulose derivative: cellulose acetate propionate, "CAP" manufactured by Eastman Chemical Company, Ltd.

Acrylic particle (5 μm): "FH-S005" manufactured by Toyobo Co., Ltd., average particle size: 5 μm, crosslinked polymethacrylate particles Acrylic particle (8 μm): "SSX-108" manufactured by Sekisui Plastics Co., Ltd., average particle size: 8 μm, crosslinked polymethacrylate particles Acrylic particle (10 μm): "FH-S010" manufactured by Toyobo Co., Ltd., average particle size: 10 μm, crosslinked polymethacrylate particles Acrylic particle (15 μm): "FH-S015" manufactured by Toyobo Co., Ltd., average particle size: 15 μm, crosslinked polymethacrylate particles Acrylic particle (20 μm): "SSX-120" manufactured by Sekisui Plastics Co., Ltd., average particle size: 20 μm, crosslinked polymethacrylate particles Initiator A: photopolymerization initiator, "IRGACURE 184" manufactured by BASF Japan Ltd.

Initiator B: photopolymerization initiator, "IRGACURE 907" manufactured by BASF Japan Ltd.

Examples 1 to 3 and Comparative Examples 4 to 5

In a mixed solvent of methyl ethyl ketone, methoxypropanol, and 1-butanol [methyl ethyl ketone/methoxypropanol/1-butanol=4/3/3 (volume ratio)], resin components and particles combined at a proportion shown in Table 1, and 1.0 part by weight of the initiator A and 1.0 part by weight of the initiator B relative to 80 parts by weight of the polyfunctional acrylate were blended to prepare a liquid composition having a total material concentration of 30% by weight.

Examples 4 to 5 and Comparative Example 3

In a mixed solvent of ethyl acetate and isopropanol [ethyl acetate/isopropanol=6/4 (volume ratio)], resin components and particles combined at a proportion shown in Table 1, and 2.5 parts by weight of the initiator A and 2.5 parts by weight of the initiator B relative to 80 parts by weight of the polyfunctional acrylate (50 parts by weight of the polyfunctional acrylate for Comparative Example 3) were blended to prepare a liquid composition having a total material concentration of 25% by weight.

Each of these liquid compositions was cast on a transparent PET substrate film with the use of any wire bar of #12 to #36 according to a desired film thickness, and then allowed to stand for one minute in an oven at 80° C. Thereafter, the coated film passed through an ultraviolet irradiation equipment (manufactured by Ushio Inc., a high-pressure mercury lamp, dose of ultraviolet ray: 500 mJ/cm$^2$) for ultraviolet curing treatment to form a coat layer (dry thickness: 7 to 13 µm).

Comparative Example 1

As a transparent laminate film, a commercially available hardcoat film A was used.

Comparative Example 2

As a transparent laminate film, a commercially available hardcoat film B was used.

Table 1 shows the evaluation results of the haze, total light transmittance, pencil hardness, SW durability, pen tip abrasion resistance, and comfortable writing experience of the resulting transparent laminate films and commercially available hardcoat films.

TABLE 1

|  |  | Examples | | | | | Comparative Examples | | | | |
|---|---|---|---|---|---|---|---|---|---|---|---|
|  |  | 1 | 2 | 3 | 4 | 5 | 1 | 2 | 3 | 4 | 5 |
| Composition <parts by weight> | Polyfunctional acrylate | 80 | 80 | 80 | 80 | 80 | — | — | 50 | 100 | 80 |
|  | Urethane acrylate | 20 | 20 | 20 | — | — | — | — | — | — | 20 |
|  | Urethane elastomer | — | — | — | 20 | 20 | — | — | 50 | — | — |
|  | Cellulose derivative | 7 | 7 | 7 | — | — | — | — | — | — | — |
|  | Acrylic particle (5 µm) | — | — | — | — | — | — | — | 5 | — | — |
|  | Acrylic particle (8 µm) | — | 2 | — | — | — | — | — | — | — | — |
|  | Acrylic particle (10 µm) | 2 | 2 | 4 | — | — | — | — | — | — | — |
|  | Acrylic particle (15 µm) | 2 | — | 1 | 1 | 3 | — | — | — | — | 2.5 |
|  | Acrylic particle (20 µm) | — | — | — | — | — | — | — | — | 5 | 1 |
| Thickness of coat layer (µm) | | 9 | 7 | 9 | 12 | 12 | — | — | 13 | 10 | 12 |
| Ra (µm) | | 0.89 | 0.86 | 1.26 | 0.53 | 0.69 | 0.23 | 0.36 | 0.26 | 2.49 | 1.92 |
| $W_{EM}$ (µm) | | 5.56 | 7.60 | 9.2 | 8.48 | 9.13 | 10.68 | 12.32 | 8.57 | 27.48 | 16.8 |
| Haze (%) | | 16.2 | 20.1 | 18.4 | 6.39 | 12.7 | — | — | 27.0 | 17.5 | 15.9 |
| Total light transmittance (%) | | 90.3 | 90.4 | 90.5 | 91.2 | 91.4 | — | — | 91.0 | 90.6 | 90.1 |
| Pencil hardness | | 3H | 3H | 3H | H | H | — | — | F | 3H | 3H |
| SW durability | | A | A | A | A | A | — | — | C | A | A |
| Pen tip abrasion resistance (µm) | | 3 | 4 | 4 | 2 | 3 | — | — | — | 20 | 11 |
| Comfortable writing experience | | A | A | A | A | A | B | B | B | A | A |

As apparent from the results in Table 1, the transparent laminate films of Examples have excellent optical characteristics and a small abrasion of the pen tip, as well as provide a comfortable writing experience. In particular, the transparent laminate film of Example 4 has the smallest abrasion of the pen tip, and in addition, satisfies a comfortable writing experience, a low haze, and better visibility. In contrast, the transparent laminate films of Comparative Examples cannot satisfy the characteristics mentioned above simultaneously.

INDUSTRIAL APPLICABILITY

According to the present invention, the transparent laminate film is utilizable for a variety of apparatuses, for example, a pen-input touch screen (in particular, a projected capacitive touch screen of ITO grid system) and a computer pointing device (such as a pen tablet). The pen-input touch screen is used, for example, in combination with a display (e.g., a liquid crystal display, a plasma display, and an organic or inorganic EL display) in a display unit of an electric or electronic equipment or precision equipment, such as a PC, a television, a mobile phone or a smartphone, an electronic paper, a game console, a mobile device, a clock or a watch, or an electronic calculator. Among them, the transparent laminate film, which has an excellent transparency and a low haze, provides an excellent visibility and is thus useful for a transmissive display. Further, the transparent laminate film offers a comfortable writing experience with even a fine-point pen and is thus particularly useful for a transmissive display provided with an electromagnetic induction type pen input system.

The invention claimed is:

1. A transparent laminate film comprising a substrate layer and a coat layer, wherein the coat layer has a surface with a maximum height of rolling circle waviness profile ($W_{EM}$) in accordance with Japanese Industrial Standards (JIS) B0610 of 5 to 15 µm and an arithmetic average roughness (Ra) of not less than 0.5 µm.

2. The transparent laminate film according to claim 1, wherein the coat layer has the surface with the arithmetic average roughness (Ra) of 0.5 to 5 µm.

3. The transparent laminate film according to claim 1, wherein the coat layer contains particles and a binder component.

4. The transparent laminate film according to claim 3, wherein the binder component comprises:
   a polyfunctional (meth)acrylate and
   a urethane (meth)acrylate, a thermoplastic elastomer, or both.

5. The transparent laminate film according to claim 1, which has a total light transmittance of not less than 85% and a haze of 1 to 30%.

6. The transparent laminate film according to claim 1, which is disposed on a surface of a display of a pen-input device.

7. The transparent laminate film according to claim 6, wherein the display is a transmissive display.

8. The transparent laminate film according to claim 6, wherein the pen-input device uses a pen having a plastic pen tip.

* * * * *